July 5, 1960  M. F. PETERS  2,944,235
HIGH TEMPERATURE COIL STRUCTURE
Filed March 21, 1957

INVENTOR.
Melville F. Peters
BY Albert F. Kronman
ATTORNEYS

United States Patent Office 2,944,235
Patented July 5, 1960

2,944,235
HIGH TEMPERATURE COIL STRUCTURE

Melville F. Peters, 29 N. Ridge Road, Livingston, N.J.

Filed Mar. 21, 1957, Ser. No. 647,539

4 Claims. (Cl. 336—199)

This invention relates to electro-magnetic apparatus and particularly to the chemical composition and construction of electro-magnetic units involving conducting windings, or coils for establishing electro-magnetic fields which devices are capable of operation at low as well as high temperatures.

This application is a continuation-in-part of an application filed by Melville F. Peters, March 10, 1953, Serial No. 341,407, now abandoned, entitled Electro-Magnetic Apparatus.

Electrical equipment which is supported by the solid or the liquid portion of the earth can be maintained below some predetermined temperature by increasing the size, or by enveloping a portion or all of the apparatus with a cooling fluid. When electrical equipment is operated above the surface of the earth, it is a necessary consideration to save weight by reducing the size and eliminating both the cooling fluid and the cooling fluid equipment. When aircraft are operated at speeds not greater than the velocity of sound, the heat generated at the interface between craft and air, will not raise the temperature of the surface of the craft over 160° F. As the speed of the aircraft is increased, the surface temperature is increased and as the speed approaches three times the velocity of sound, the surface temperature approaches 1000° F. Since all electrical equipment must generate heat in the windings, the temperature of the coils will exceed their ambient temperature, so that if the equipment is located near the interfaces between craft and air, the temperature of the units may reach or even exceed 1150° F. It is therefore the first object of the invention to fabricate an electro-magnet which will operate over a temperature range that is limited only by the melting point of the metal and the softening point of the metal oxides or other ceramic material which form the component parts of the device.

It is a second object of the invention to fabricate an electro-magnet which contains no organic material exclusively.

It is a requirement of the specification for magnet wire that the insulation on the wire be free of pin holes and indicate an infinite resistance when the resistance is measured at a voltage above the operating voltage of the magnet. These two requirements are the results of many years of experience and they have been formulated to eliminate the leakage of currents of electricity through and into the organic insulating material. Leakage currents through pin holes can arise through the accumulation of moisture and dirt in the holes; and if a self-induced electro-motive force is established in the coil due to a change in current flow through the coil, an arc may be established through the pin holes which will destroy the organic material and eventually lead to coil failure. When metal oxides or other ceramic materials are substituted for organic insulation, leakage currents or momentary arcing through pin holes will not lead to a deterioration of the insulation. Since the ceramically insulated coils will be either hermetically sealed or operate at temperatures above the boiling point of water, the probability of coil failure by arcing through pin holes with ceramic insulation can be made to approach zero. Leakage currents through organic material will cause over-heating and consequently a rapid rate of deterioration of organic insulating material. Leakage currents with ceramic insulation will cause an increase in temperature, but the rate of deterioration of the ceramic material will not be appreciably changed, since the only change in the ceramic material will be a movement of ions when a potential difference is established in the insulation. Such ionic movement might cause an increase in the brittleness of the ceramic material, but in the formed coil this is not important. It is therefore a third object of the invention to fabricate a coil which permits current to flow through the insulation to adjacent elements of the coil above some elevated temperature or temperature range, but not to an extent great enough to melt or cause a rapid deterioration of the metal conductors, or the ceramic materials used for electrical insulating and corrosion resisting purposes.

It is a fourth object of the invention to surround and cover each layer or segment of the wire with ceramic material, which may be the same enamel that covers the conductors, or it may be a material having a higher melting point, or a combination of the enamel and the material having the higher melting point, so as to increase the resistance and dielectric strength of the insulation between the designated sections.

It is a fifth object of the invention to cover and hermetically seal the structural parts of the electro-magnet with ceramic material, so as to protect the metal parts from moisture and other corrosive vapors and gases.

Other objects and advantages of the invention will be apparent upon examination of the following description of the embodiment of the invention as illustrated in the accompanying drawings wherein.

Figure 1:
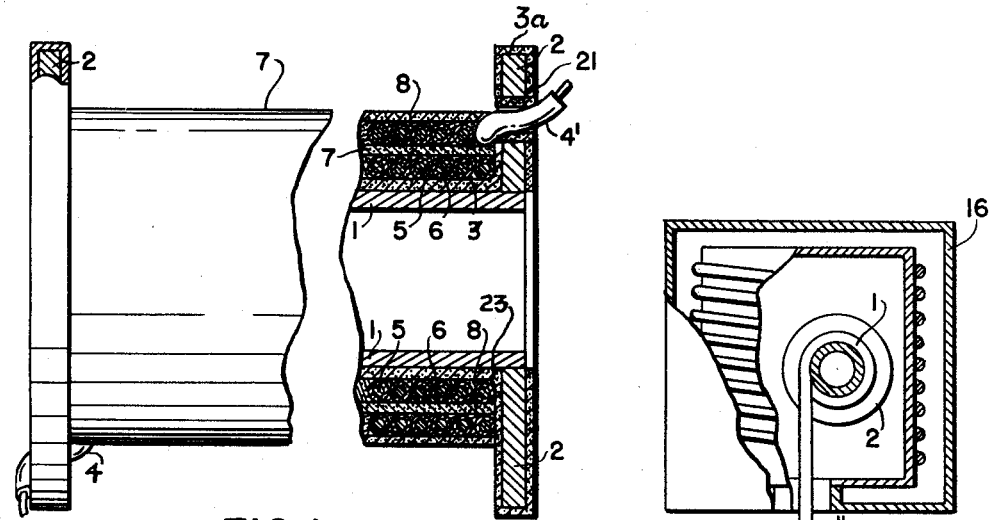
Figure 1 is a longitudinal sectional view of an electro-magnet embodying the invention.

Referring to Figure 1 there is shown a solenoid which is formed of a non-magnetic metal tube 1 having iron disks 2 welded to each end thereof. The metallic tube 1 is covered with an insulating ceramic enamel 3 hereinafter more fully described. The ceramic enamel 3 bears a certain relationship to the metal which it overlies. To describe this relationship the word "matched" has been used in this application. By the word "matched" is meant that; the essential properties of the enamel necessary for the efficient operation of the coil at both low and high temperatures are substantially the same as those of the metal.

Thus, the insulating ceramic enamel which is to be used in connection with the underlying metal structure is selected so as to have the same or a slightly lower coefficient of expansion at the lower temperature where the ceramic is brittle and if necessary a slightly different coefficient of expansion from that of the metal can be tolerated at the higher temperatures where the ceramic is somewhat plastic and not subject to cracking or destruction.

After the metallic tube 1 is covered with its matching insulating ceramic 3, the disks 2 are covered with another matching enamel 3ª. It is to be understood that the enamel 3ª may be selected to match more closely the disks 2 in the event that the characteristics of the metal of the disks are specifically different from those of the non-magnetic metallic tubes 1. The copper wire 5 is insulated with a matching ceramic 6 and is wound over the electrically insulated tube 1. If the coil consists of a single layer of wire the ends of the coils 4 and 4' are passed through the disks 2 and are insulated from the disks by special bushings 21 or by an extra thickness of ceramic enamel. Enamels 3 and 3ª are blended at 23 where they meet in accordance with well known techniques to prevent cracking at this point. Whether the coil consists of a single layer or a plurality of layers, the air spaces between the turns of wire may be filled with a powdered ceramic material 8 and then a layer of ceramic material 7 having the same properties as enamel 6 is put over the insulated wires to hermetically seal the first layer when heated to the curing temperature. When a second layer is needed the covered wire is wound over the ceramic material 7, before the end 4' is passed through the disk 2. The filling of the air spaces between the turns of wire in the second layer with ceramic material 8, which is a high melting point powder such as quartz or aluminum oxide, and the covering of the second layer of wire with enamel is a repetition of the procedure for the first layer. By repeating this process, the coil may be built up to any number of layers. For many types of work the filling and sealing of the air spaces with ceramic material and the covering which insulates and hermetically seals the coil when it is fused is not required.

Figure 2:
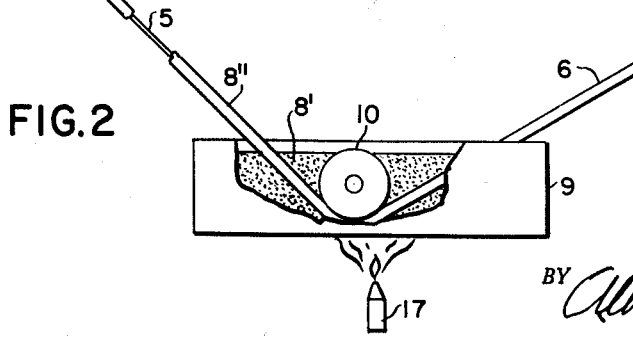
Figure 2 is a transverse view illustrating one method of forming the electro-magnet of Figure 1.

In Figure 2 the insulated conductor is heated to, or above, the annealing temperature of the ceramic insulating enamel 6, so that the wire may be wound on tube 1 without cracking the enamel. The heating may be done by applying heat directly to the enameled wire, or the wire may be drawn through a chamber 9 filled with a powdered ceramic material 8', which forms a covering or film 8'' over the enamel 6. This powdered material is more refractory than the enamel and when the covering is baked with the enamel, either before or after winding the insulated wire, the combination of the two will produce an insulating material between the conducting elements of the coil, which has a higher softening point, a higher electrical resistance and a greater dielectric strength at elevated temperatures than the enamel. For simplification of the drawings, the same material symbol is used for enamel 6 covered with powder 8', but the combination of the two is designated by 8''.

Figure 3:
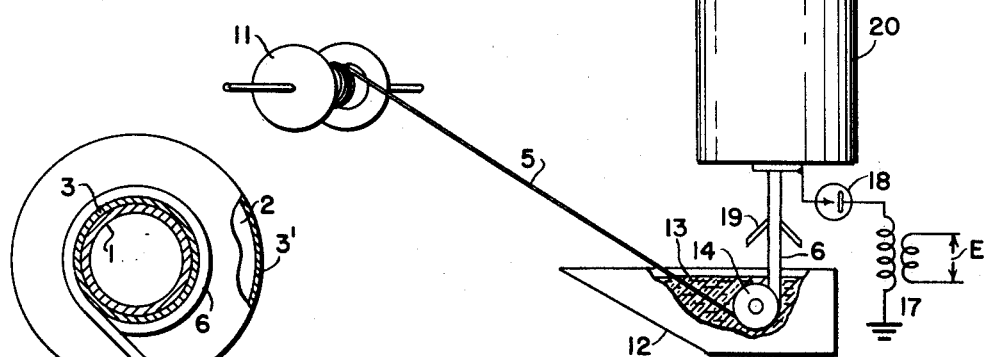
Figure 3 is a diagrammatic view of an alternate method of forming the electro-magnet.

Referring to Figure 3 there is shown a further method of forming the coil of the electro-magnet. In the apparatus illustrated in Figure 3, the bare conductor or wire 5 from the spool 11 is passed under a pulley 14. The pulley is supported by the walls of the tank 12 and the tank is filled with a sufficient quantity of ceramic enamel 13 to cover the conductor 5 after it leaves the pulley 14. For most ceramic materials the viscosity of the enamel and the rate at which the wire is wound on the core 1 determines the thickness of the enamel. The temperature of the furnace 20 is adjusted to dry and bake the enamel during the time it takes the wire to pass from the enamel pot 12 to the point of passage around the tube 1. As the conductor 5 leaves the tank 12 it is covered with a coating of enamel 6, the thickness of which coating can be regulated by means of a scraper 19 which is disposed about the coated conductor 5. The conductor 5 then enters a furnace 20 which may be electrically heated by coils 22 as indicated in Figure 3. The furnace 20 is provided with a central cylinder 15, within which there is carried a quantity of powder 8' such as has been previously referred to in connection with Figure 2. The powder 8' can be precipitated upon the enamel 6 which overlies the conductor 5 by applying a high potential difference between the cylinder 15 and the conductor 5 and making the conductor 5 negative to the cylinder 15. This procedure can be employed when the coil may be used at a temperature above the softening point of the enamel or when the electrical resistance drops below some predetermined value. This electrical gradient can be established and maintained by the transformer 17 and the rectifying tube 18. The thickness of the refractory powder 8' deposited upon the enamel 6 to form the layer 8'' is controlled by the potential gradient between the conductor 5 and the cylinder 15, the speed of the wire through the gradient and the temperature of the furnace 20. The coated wire shown in Figure 3 is wound upon the coil 1.

Before it is cooled below the annealing temperature of the ceramic insulating material and as described in connection with Figure 2, the ceramic enamel 6 and the powdered refractory material 8' may be fused in the furnace 20 or the powder may simply cover and adhere to the enamel during the process of curing the enamel in the furnace. The furnace 16 shown in Figure 3 is a further method for heating the coils while winding the wires at elevated temperatures.

If the ratio of wire diameter to coil diameter is not less than 4 to 1, or if the thickness of the enamel is not over 0.004 of an inch, the wire can be wound at room temperature and the process of preheating the wire above room temperature during winding can be eliminated.

Chemical compositions of a ceramic enamel for electrically insulating stainless steel at high temperatures, which are suitable for use in conjunction with the present structures are as follows:

First mix the following ingredients to form frit I and frit II.

| Ingredients | Parts by weight | |
| --- | --- | --- |
| | Frit I | Frit II |
| Feldspar | 31.0 | 31.0 |
| Flint | 11.4 | 18.0 |
| Borax | 37.1 | 37.1 |
| Soda ash | 5.9 | 5.9 |
| Soda nitre | 3.8 | 3.8 |
| Fluorspar | 9.0 | 3.0 |
| Cobalt oxide | 0.5 | 0.5 |
| Nickel oxide | 0.4 | 0.6 |
| Manganese oxide | 0.9 | 1.1 |
| | 100.0 | 101.0 |

After thoroughly mixing, the frits are sintered and then ground to a fine powder.

The following materials are then put together to form the enamel:

Ingredients: Parts by weight
Frit I ---------------------------------- 50.0
Frit II --------------------------------- 50.0
Calcined alumina ------------------------ 25.0
Enameled clay --------------------------- 10.0
Black cobalt oxide ---------------------- 1.0
Citric acid crystals -------------------- 0.5
Water ----------------------------------- 50.0

186.5

Chemical composition of a ceramic enamel for electrically insulating copper at high temperatures.

Batch composition: Parts by weight
Feldspar ----------------------------- 35
Flint -------------------------------- 10
Borax -------------------------------- 10.9
Soda nitre --------------------------- 6.2
Soda ash ----------------------------- 22.2
Red lead ----------------------------- 22.6
Fluorspar ---------------------------- 4.5
Cryolite ----------------------------- 5.0
Cobalt oxide ------------------------- 0.8
Potash nitre ------------------------- 4.7

121.9

The foregoing ceramic enamels are matched to the metal which they overlie in that their thermal coefficients of expansion are the same or in general slightly less than the thermal coefficient of expansion in the metal. The effect of the relationship between the respective coefficients of expansion is that when the enameled metal is cooled, the enamel will be slightly under compression. By operating the device with the enamel under compression certain advantages have been achieved since generally speaking the enamels are ten times as strong in compression as in elongation. Consequently, if a sheet of metal is bent into an arc the enamel on the inner surface is compressed a little more than the enamel on the outer surface which is somewhat elongated. By having the ceramic under compression before bending of the metal the enamel on the outer surface will remain under slight compression or at most be only slightly elongated. Cracking of the enamel due to the bending or expansion of the underlying metal is thereby eliminated or very substantially reduced. In one preferred form of the embodiment the enamel is put on the metal cold and baked or cured at a temperature of around 1800° F. As the enamel on the metal cools, it hardens, and after it reaches a temperature of 1000° F. it is no longer plastic. Consequently, if there is a difference in the thermal expansion of the enamel and metal, shearing stresses would be developed on the interface between the enamel and the metal.

It is important in the operation of the coil as set forth herein that the development of shearing stresses on the contacting surfaces between the enamel and the metal be avoided. In no event should the stresses at the contacting surfaces exceed the bonding strength between the enamel and the metal.

Under certain conditions of operation, the wire 5 will heat up more rapidly than its ceramic coating. In these instances the coefficient of expansion of the enamel must be more closely matched to that of the conductor. Where the heat is applied externally of the coil the enamel will always be hotter on the heating cycle than the metal, so that the hot enamel and cooler metal will expand at nearly the same rate. Since cooling takes place much more slowly than heating, the temperature difference between enamel and metal during cooling will always be less than the temperature difference between the enamel and the metal during heating. Thus the smaller coefficient of expansion of the enamel compared to the metal not only produces the advantage of resisting deformation as previously discussed but has a further advantage during heating.

It is to be noted that the wire once in place is not subject to bending or impact and consequently, a closer thermal expansion of the enamel can be used to the thermal expansion of the metal than when metals are used which are not protected from bending and stretching forces. It follows from the foregoing that an enamel which must protect a metal member from corrosion and high temperature and which may be flexed at low temperatures when the exterior surface is heated should have a coefficient of expansion slightly less than that of the metal. On the other hand, when enamel is used to insulate a wire where the wire can be heated when the coil is at a relatively low temperature the best coil is obtained when the coefficient of thermal expansion of the enamel is the same as the thermal expansion of the wire. Since as a practical matter it is difficult for the coefficient of thermal expansion and of the enamel to be equal to the thermal expansion of the metal throughout the temperature range, it is necessary to match the two as close as possible where the stresses are greatest and the ceramic is most brittle so that the two expansions are close enough together to allow the coil to heat and cool without chipping the enamel off the wire.

From the foregoing it will be seen that there has been provided a coil structure which may be used at high and low temperatures and which will remain free of chipping or deterioration over prolonged uses at wide variations in temperature.

Having thus fully described the invention, what is claimed as new and desired to be secured by Letters Patent of the United States, is:

1. A high temperature coil structure comprising, a metallic core member, a first coating of a matching enamel overlying said core, a metal disk at each end of the core, a second coating of a matching enamel overlying the disks, layers of wire around the core coating between the disks, a covering of a ceramic matched to the metal of the wire around said wire, a quantity of a powdered refractory material filling the spaces between the covered wire and the covered core and a layer of ceramic enamel overlying the powdered material and the coil.

2. A high temperature coil structure comprising, a metallic core member, a first coating of a matching enamel overlying said core, a metal disk at each end of the core, a second coating of a matching enamel overlying the disks, layers of wire around the core coating between the disks, a covering of a ceramic matched to the metal of the wire around said wire and a covering of a powdered high refractory material having a melting point above that of the wire ceramic overlying and secured to the said wire ceramic.

3. A high temperature coil structure comprising, a metallic core member, a first coating of a matching enamel overlying said core, a metal disk at each end of the core, a second coating of a matching enamel overlying the disks, layers of wire around the core coating between the disks, a covering of a ceramic matched to the metal of the wire around said wire, a quantity of a powdered refractory material filling the spaces between the covered wire and the covered core and a layer of ceramic enamel overlying the powdered material and the coil and a covering of a powdered, high refractory material having a melting point above that of the wire ceramic overlying and secured to the said wire ceramic.

4. A high temperature coil structure according to claim 1 and in which the powdered refractory material comprises quartz.

References Cited in the file of this patent

UNITED STATES PATENTS

| | | |
|---|---|---|
| 495,026 | Demmick | Apr. 11, 1893 |
| 1,777,571 | McCullough | Oct. 7, 1930 |
| 2,169,570 | Ronci | Aug. 15, 1939 |
| 2,179,257 | Goloviznin | Nov. 7, 1939 |
| 2,241,505 | Cuttler | May 13, 1941 |
| 2,318,435 | Stupakoff | May 4, 1943 |
| 2,421,652 | Robinson et al. | June 3, 1947 |
| 2,453,725 | Price | Nov. 16, 1948 |
| 2,478,633 | Lord | Aug. 9, 1949 |
| 2,608,610 | Thulin | Aug. 26, 1952 |
| 2,751,318 | Speekman | June 19, 1956 |
| 2,771,386 | Merz et al. | Nov. 20, 1956 |

FOREIGN PATENTS

| | | |
|---|---|---|
| 427,599 | France | Aug. 8, 1911 |